United States Patent [19]

Bocharov et al.

[11] 4,254,349
[45] Mar. 3, 1981

[54] LINEAR INDUCTION MOTOR

[76] Inventors: Vasily I. Bocharov, pereulok Knizhny, 5; Jury V. Kuprianov, ulitsa Svobody, 11, kv. 11, both of Novocherkassk; Alexandr D. Popov, pereulok Rynochny, 44; Vladimir A. Solomin, ulitsa Dachnaya, 14, kv. 31, both of Rostov-na-Donu, all of U.S.S.R.

[21] Appl. No.: 952,600

[22] Filed: Oct. 18, 1978

[51] Int. Cl.³ .............................................. H02K 41/04
[52] U.S. Cl. ........................................ 310/13; 310/216
[58] Field of Search ................................ 310/12–14, 310/216–218

[56] References Cited

U.S. PATENT DOCUMENTS

| | | | |
|---|---|---|---|
| 2,243,318 | 5/1941 | Rawlings | 310/216 X |
| 3,585,423 | 6/1971 | Bolton et al. | 310/13 |
| 3,770,995 | 11/1973 | Eastham et al. | 310/13 |
| 3,836,799 | 9/1974 | Eastham et al. | 310/13 |

OTHER PUBLICATIONS

T. K. Kalnin, E. J. Polmanis, "Three-Phase Induction Pump With a Separate Magnetic Circuit", *Magnetic Hydrodynamics,* No. 2, 1969.

Popov et al., "Construction of Linear Induction Motors With Transversely Closed Magnetic Flux", Registration 663/78, 40 pp.

*Primary Examiner*—Donovan F. Duggan
*Attorney, Agent, or Firm*—Fleit & Jacobson

[57] ABSTRACT

A linear induction motor comprising an inductor formed of a laminated core structure with slots adapted to receive a polyphase winding. It also comprises a secondary element with respect to which the inductor moves. The secondary element includes an electrically conductive part arranged on a magnetically conductive base. Each lamination transversely of inductor movement has an inverted U-shaped configuration and a varying height and width so that a larger lamination encompasses a smaller lamination.

2 Claims, 2 Drawing Figures

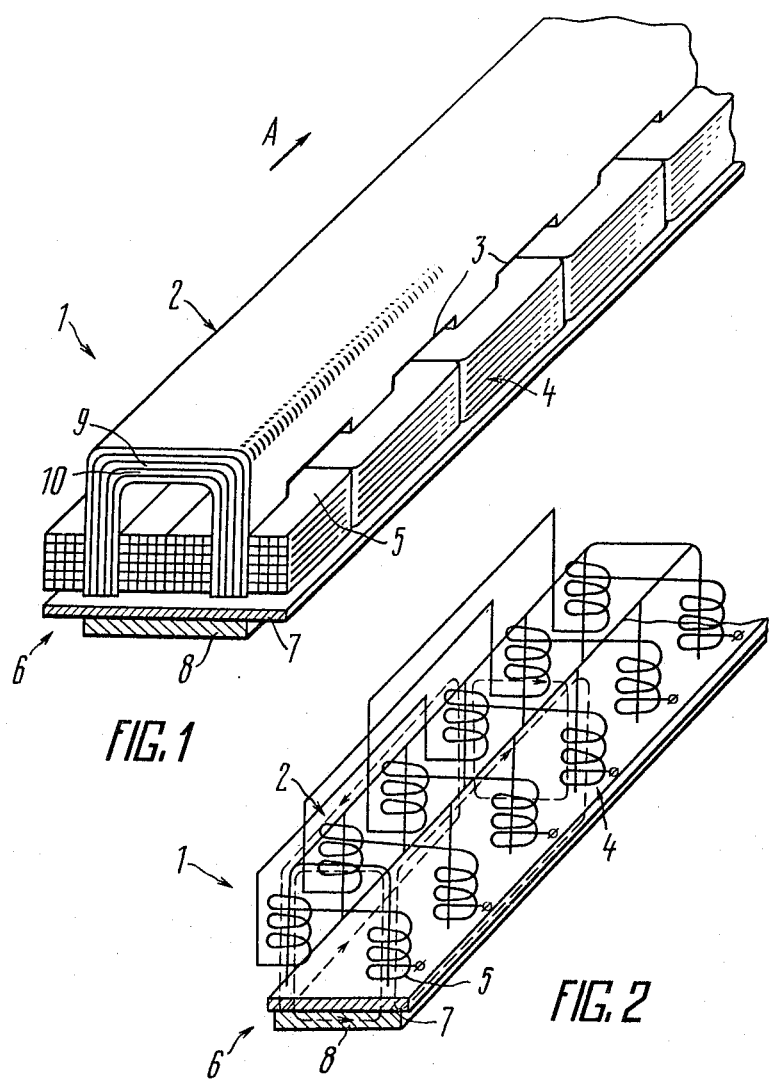

LINEAR INDUCTION MOTOR

FIELD OF THE INVENTION

This invention relates to the electrical machines and in particular to linear induction motors.

The linear induction motor forming the subject of the present invention is suitable for high-speed ground transport systems. It may also find application in conveyer installations and in various power drives wherein working members perform a rectilinear or reciprocating motion.

DESCRIPTION OF THE PRIOR ART

In view of the present day requirements an inductor of a linear induction motor should be simple and reliable and contain as few parts as possible. It is also desirable that such an inductor should be free of inoperative air gaps within a magnetic circuit to decrease reactant power consumption.

Known in the art is a linear induction motor (cf. British Pat. Ser. No. 1,316,131 Cl. H2A, 1973) comprising an inductor formed of separate inverted U-shape transversal laminations surrounded by a polyphase concentrated winding and interconnected by inverted U-shaped longitudinal laminations and a secondary element having an electrically conductive part arranged on a magnetically conductive base.

Such an inductor is rather complicated since it includes both transversal and longitudinal laminations.

Also known in the art is a linear induction motor (cf. "Construction of Linear Induction Motors with Transversely Closed Magnetic Flux" by A. D. Popov and V. A. Solomin, Central Technical and Economic Research Institute under the Ministry of Communications, Registration No. 663/78) comprising an inductor formed of a laminated core structure with slots adapted to receive a polyphase winding and a secondary element with respect to which the inductor moves, the secondary element having an electrically conductive part arranged on a magnetically conductive base. In the aforesaid motor the core structure of the inductor comprises three elements (longitudinal laminations adjacent inverted U-shaped transversal laminations on both sides).

Such a core structure is rather complicated. Furthermore, magnetizing power consumption is increased due to the presence of inoperative gaps formed of combined elements of the core structure. The aforesaid linear induction motor is not fully reliable in operation.

SUMMARY OF THE INVENTION

It is an object of the present invention to simplify the construction of a linear induction motor.

Another object of the invention is to eliminate inoperative air gaps within a magnetic circuit contained in a motor.

A further object of the invention is to enhance operational reliability of a linear induction motor.

The foregoing objects are accomplished in a linear induction motor comprising an inductor formed of a laminated core structure with slots adapted to receive a polyphase winding and a secondary element with respect to which the inductor moves, wherein the secondary element has an electrically conductive part arranged on a magnetically conductive base; according to the invention, each lamination transversely of inductor movement has an inverted U-shaped configuration and a varying height and width so that a larger lamination encompasses a smaller lamination.

A fairly simple core structure has as few elements as possible to increase operational reliability of the proposed linear induction motor. The absence of combined elements within the core structure eliminates inoperative air gaps within a magnetic circuit of the motor. The linear induction forming the subject of the present invention provides an easier production process and a lower cost as compared to prior art motors.

DESCRIPTION OF DRAWINGS

The invention will now be described in greater detail with reference to a specific embodiment thereof, taken in conjunction with the accompanying drawings, wherein:

FIG. 1 is a perspective view of a linear induction motor according to the invention; and FIG. 2 shows diagrammatically the arrangement and connection of coils within a three-phase winding of a linear induction motor according to the invention.

DESCRIPTION OF THE INVENTION

The linear induction motor forming the subject of the present invention comprises an inductor 1 (FIG. 1) formed of a core structure 2 having electrical steel laminations with slots 3 adapted to receive a polyphase concentrated winding 4 composed of coils 5. A distributed polyphase winding may, however, be used. The proposed linear induction motor also comprises a secondary element 6 with respect to which the inductor 1 moves. The secondary element 6 has an electrically conductive part 7 arranged on a magnetically conductive base 8. Each lamination 2 transversely of inductor 1 movement has an inverted U-shaped configuration and a varying height and width. So, each larger lamination (for example, a lamination 9) encompasses a smaller lamination (for example, a lamination 10).

The coils 5 (FIG. 2) of the polyphase concentrated winding 4 are arranged and interconnected so that a magnetic flux may be closed longitudinally and transversely of inductor 1 movement. Dashed lines denote the paths along which a magnetic flux set up by one phase of the polyphase winding 4 is closed.

A preferred embodiment of the invention operates as follows.

Connecting the coils 5 (FIG. 1) of the polyphase winding 4 to a three-phase power source (not shown in the drawings) sets up a travelling magnetic field which crosses the electrically conductive part 7 of the secondary element 6 with the result that electromotive forces are induced therein. Three-phase eddy currents induced within the electrically conductive part 7 of the secondary element 6 under the action of the aforesaid electromotive forces interact with the travelling magnetic field of the inductor 1 whereby tractive and levitational forces of the linear induction motor will be developed. The tractive force causes the inductor 1 to move in the opposite sense to the travelling magnetic field (sense of inductor movement is shown with the arrow A in the drawing).

The travelling magnetic field of the linear induction motor (FIG. 2) is closed along paths denoted by the dashed lines, i.e., longitudinally and transversely of inductor 1 movement. The provision of transversal paths along which a magnetic flux is closed substantially reduces the pulsating components of the magnetic flux and in effect decreases an adverse influence of the primary end effect. The proposed linear induction motor is simple and reliable in operation.

It is obvious that the embodiments of the present invention described hereinabove are merely illustrative and that other modifications and adaptations thereof may be made without departing from the scope of the appended claims.

What is claimed is:

1. In a linear induction motor comprising:
   an inductor,
   a secondary element with respect to which said inductor is movable,
   a magnetically conductive base of said secondary element,
   an electrically conductive part of said second element arranged on said magnetic base,
   and a core structure of said inductor; the improvement wherein said core structure of said inductor comprises electrical steel laminations provided with slots, each said electrical steel lamination transversely of said inductor movement having an inverted U-shaped configuration and a varying height and width, each said lamination of larger size encompassing said laminations of smaller size;
   the improvement further comprising a polyphase winding of said inductor enclosed within said slots of said core structure.

2. In a linear induction motor as recited in claim 1, wherein said core structure of said inductor comprises a single core having said electrical steel laminations, said linear induction motor employing magnetic fluxes which are closed both longitudinally and transversely, whereby to provide superior efficiency in operation of said linear induction motor.

* * * * *